(12) United States Patent
Goodman et al.

(10) Patent No.: US 6,678,434 B1
(45) Date of Patent: Jan. 13, 2004

(54) DISK DRIVE OPTICAL SWITCH

(75) Inventors: Albert Goodman, Albuquerque, NM (US); Mohsen Shahinpoor, Albuquerque, NM (US)

(73) Assignee: Wizard Technologies, Inc., Albuquerque, NM (US)

( * ) Notice: Subject to any disclaimer, the term of this patent is extended or adjusted under 35 U.S.C. 154(b) by 11 days.

(21) Appl. No.: 09/626,342

(22) Filed: Jul. 26, 2000

(51) Int. Cl.[7] .............................. G02B 6/26; G02B 6/00
(52) U.S. Cl. ........................................................ 385/16
(58) Field of Search ............................ 385/16–33, 147

(56) References Cited

U.S. PATENT DOCUMENTS

| | | | |
|---|---|---|---|
| 4,223,978 A | 9/1980 | Kummer et al. ............ 350/96.2 |
| 4,580,292 A | 4/1986 | Laor ............................ 455/607 |
| 4,652,081 A | 3/1987 | Fatatry ....................... 350/96.2 |
| 5,214,727 A | * 5/1993 | Carr et al. ..................... 385/22 |
| 5,216,729 A | 6/1993 | Berger et al. .................. 385/31 |
| 5,261,015 A | * 11/1993 | Glasheen ...................... 385/23 |
| 5,808,472 A | 9/1998 | Hayes ......................... 324/671 |
| 5,870,518 A | 2/1999 | Haake et al. ................. 385/90 |
| 5,915,063 A | 6/1999 | Colbourne et al. .......... 385/140 |
| 6,195,231 B1 | 2/2001 | Sedlmayr et al. ............ 360/123 |
| 6,200,882 B1 | 3/2001 | Drake et al. ................. 438/464 |
| 6,266,233 B1 | 5/2001 | McDaniel et al. ............ 369/13 |

* cited by examiner

Primary Examiner—Akm Enayet Ullah
(74) Attorney, Agent, or Firm—Deborah A. Peacock; Jeffrey D. Myers; Andrea L. Mays

(57) ABSTRACT

An apparatus and method of optical switching wherein the output ends of input optical channels 142 are held by and movable by actuator arm 108 of a conventional computer disk drive assembly and the input ends of output optical channels 144 are held by and movable by the disk 102 of the assembly. Fixed supports 120 and 136 stabilize the input and output optical channels prior to entry into the optical switch 100. A high resolution voice coil motor receives the switching signal and moves the actuator arm which in turn moves the input optical channels to align them with the selected output channels. Disk 102 is preferably partially rotatable by a disk motor so that the output optical channels are movable and switching speed can be increased. A linear embodiment operates in an equivalent manner with a linearly movable disk and linear actuator arm. An alternative embodiment operates with two or more voice coil motor driven actuator arms, without the use of a disk.

13 Claims, 10 Drawing Sheets

DISK DRIVE OPTICAL SWITCH

BACKGROUND OF THE INVENTION

1. Field of the Invention (Technical Field)

The present invention relates to optical switches, particularly to the use of voice coil motor based computer disk drive assembly technology to align input and output optical channels.

2. Background Art

Present day optical fiber technologies are revolutionizing the telecommunications industry. Tremendous advances have been made in the field of telecommunications over the past decade. It has been estimated that this technology is capable of carrying tens of millions of conversations simultaneously on a single optical fiber. Optical fiber communication systems offer many advantages over systems that use copper wire or radio frequency links as transmission media. They include lower transmission losses, higher bandwidths, higher transmission rates, lower implementation costs, greater reliability and greater electrical isolation characteristics. It is clear that optical fiber communication will dominate the telecommunications industry in the very near future because of advantages such as these.

Fiber optic switching is an important component in any telecommunication system. These systems use switches to establish communication channels among two or more of their interfaces. An optical fiber switch is capable of optically connecting, interrupting or aligning, any one or more of a first group of optical fibers with any one or more of a second group of optical fibers, or vice versa, enabling an optical signal to propagate through the optical interface junction between newly aligned fibers.

When two optical fibers are aligned end-to-end, light entering one fiber (the input or sending fiber) will continue into and through the second fiber (the output or receiving fiber) while the two adjacent ends, or faces, are aligned and close together. Fiber optic switches misalign or disjoin the adjacent ends of the fibers by moving one or both of the two ends. By moving, for example, the first fiber's end to a new location, the signal, in this case light, can be redirected into a third fiber by aligning the first fiber's end with an end of the third fiber.

Lateral separation of two adjacent fiber ends will result in loss of light between the two fibers and a light absorber is typically provided beside the fiber which either moves into place as the receiving fiber moves away or stays in place as the sending fiber moves away. Space is provided for this motion. This effectively switches the signal off. The discontinuity between the fiber ends may be either perpendicular to the fiber axis or at some angle to the axis but the gap is minimal when the fibers are aligned.

Fibers are often collected into a bundle, a fiber optic cable, with a structure set up at the active location to permit the required motion of a fiber end. A fiber bundle can be separated from a circular bundle cross-section to a linear arrangement where the fibers are in a straight line at the switch but reformed into a bundle again at the device exit.

Optical fiber switches may include electronic processing as part of signal transmission. Switches wherein the signal is entirely optical while being transmitted, such as the present invention, are described as photonic. Optical fiber switches, which are totally photonic, generally utilize fiber positioning means, alignment signal emitter means and computer control means. Some switching concepts, not utilized in the present invention, may include light beams and lenses. Normally, a fiber positioning means is provided near the end of one fiber to selectively point the end of that fiber in one fiber group toward the end of another fiber in the other fiber group to perform a switched optical transmission. Patents proposing to perform such switching actions in fiber optic telecommunication systems include: U.S. Pat. No. 5,024,497, to Jebens, entitled "Shape Memory Alloy Optical Fiber Switch," which discusses switching activated by a shape memory alloy wire in a transverse direction. U.S. Pat. No. 4,512,036, entitled "Piezoelectric Apparatus for Positioning Optical Fibers," U.S. Pat. No. 4,543,663, entitled "Piezoelectric Apparatus for Positioning Optical Fibers," U.S. Pat. No. 4,651,343, entitled "Piezoelectric Apparatus for Positioning Optical Fibers," and U.S. Pat. No. 5,524,153, entitled "Optical Fiber Switching System and Method Using Same," all to Laor, use piezoelectric bimorphs for positioning optical fiber switches. U.S. Pat. No. 4,303,302, to Ramsey, et al., entitled "Piezoelectric Optical Switch" discusses other forms of piezoelectric bimorphs for optical fiber switching.

Other patents discussing fiber optic switching include: U.S. Pat. No. 5,812,711, to Glass, et al., entitled "Magnetostrictively Tunable Optical Fiber Gratings"; U.S. Pat. No. 5,812,711 to Malcolm, et al., entitled "Magnetostrictive Tunable Optical-Fiber Gratings"; U.S. Pat. No. 4,759,597, to Lamonde, entitled "Mechanical Switch for Optical Fibers"; U.S. Pat. No. 4,415,228, to Stanley, entitled "Optical Fiber Switch Apparatus"; U.S. Pat. No. 5,004,318, to Ohashi, entitled "Small Optical Fiber Switch"; U.S. Pat. No. 4,844,577, to Ninnis, et al, entitled "Bimorph Electro Optic Light Modulator"; U.S. Pat. No. 4,512,627, to Archer, et al., entitled "Optical Fiber Switch, Electromagnetic Actuating Apparatus with Permanent Magnet Latch Control"; U.S. Pat. No. 5,699,463, to Yang, et al., entitled "Mechanical Fiber Optic Switch"; U.S. Pat. No. 5,841,912, to Mueller-Fiedler, entitled "Optical Switching Device"; U.S. Pat. No. 5,647,033, to Laughlin entitled "Apparatus for Switching Optical Signals and Method of Operation"; U.S. Pat. No. 4,886,335, to Yanagawa, et al., entitled "Optical Fiber Switch System"; and U.S. Pat. No. 4,223,987, to Kummer, et al., entitled "Mechanical Optical Fiber Switching Device." These patents disclose various methods for fiber optic switching, including mechanical devices such as rods, motors, and adapters, as well as wave guides and reflectors.

The present invention overcomes deficiencies in the prior art and provides fast and accurate optical switching. A modified conventional computer disk drive is used to move optical fibers over distances of a few centimeters with an access time of a few milliseconds. A group of fibers are input through and held by the actuator arm, or head, assembly of the computer disk drive and movement of the actuator arm then aligns/misaligns the input fibers with selected output fibers that are placed through and held by the disk of the disk drive. Additionally the disk is partially rotatable, and the combined movement of the actuator arm and the disk increases the switching speed. A conventional computer disk drive with a high resolution voice coil motor is used to achieve positional resolution on the order of 0.5 micron.

SUMMARY OF THE INVENTION
(DISCLOSURE OF THE INVENTION)

The present invention is an optical switch comprising at least one actuator arm for fixedly holding at least one input optical channel, and a disk for fixedly holding at least one output optical channel, wherein at least one of the actuator arm and disk are movable with respect to the others so that the at least one input optical channel is aligned with selected of the at least one output optical channel. The actuator arm comprises at least one opening for fixedly holding at least one output end of the at least one input optical channels. The disk also comprises at least one opening for fixedly holding at least one input end of the at least one output optical channel.

A voice coil motor is used for receiving a switching signal to cause each actuator arm to move with respect to the disk. The voice coil motor can be a linear voice coil motor if the actuator arm is a linear actuator arm. Otherwise the actuator arm is pivotable. Preferably the voice coil motor comprises a high resolution voice coil motor providing a positional resolution of between approximately 0.25 and 1 micron. The optical switch further comprises fixed supports for stabilizing the input and output optical channels. The disk of the optical switch preferably comprises a partially rotatable disk. Alternatively, the disk of the optical switch comprises a linearly movable disk that operates in conjunction with a linear actuator arm that is controlled by a linear voice coil motor.

The present invention is also a method of optical switching comprising the steps of providing a disk drive assembly; fixedly holding at least one input optical channel with at least one actuator arm of the disk drive assembly; fixedly holding at least one output optical channel with the disk of the disk drive assembly; moving at least one of the at least one actuator arm and disk with respect to the others; and aligning the at least one input optical channel with the selected at least one output optical channel. The step of fixedly holding at least one input optical channel with at least one actuator arm comprises providing at least one opening in the actuator arm for fixedly holding at least one output end of the at least one input optical channel. Fixedly holding at least one output optical channel with the disk of the disk drive assembly comprises providing at least one opening in the disk for fixedly holding at least one input end of the at least one output optical channel.

The method further comprises the step of receiving a switching signal with at least one voice coil motor and thereby moving the at least one actuator arm. Receiving a switching signal with at least one voice coil motor can comprise receiving a switching signal with at least one linear voice coil motor, when the actuator arm is a linear actuator arm. The method of optical switching further comprises the step of achieving a positional accuracy of between approximately 0.25 and 1 micron when aligning the input and output optical channels.

The step of moving at least one of the at least one actuator arm and disk with respect to the other can comprise pivoting at least one pivotable actuator arm with respect to the disk. Alternatively, moving at least one of the actuator arm and disk with respect to the others comprises linearly moving at least one linear actuator arm with respect to the disk. The method can further comprise the steps of stabilizing the at least one input optical channel with a fixed support and stabilizing the at least one output optical channel with a fixed support. Moving at least one of the at least one actuator arm and disk with respect to the others can comprise partially rotating a partially rotatable disk with respect to the at least one actuator arm. Alternatively, moving at least one of the at least one actuator arm and disk with respect to the others comprises linearly moving a linearly movable disk with respect to the at least one actuator arm.

The present invention is further an actuator arm optical switch comprising at least two actuator arms for fixedly holding at least one input optical channel and at least one output optical channel, wherein at least one of said actuator arms is movable with respect to the others so that the at least one input optical channel is aligned with the selected at least one output optical channel. At least one of the actuator arms comprises at least one opening for fixedly holding at least one output end of the at least one input optical channel. The remainder of the actuator arms comprise at least one opening for fixedly holding at least one input end of said at least one output optical channel. The optical switch further comprises at least one voice coil motor capable of receiving a switching signal and causing the at least one actuator arm to pivot. Preferably the voice coil motor comprises a high resolution voice coil motor providing a positional resolution of between approximately 0.25 micron and 1 micron. The optical switch preferably further comprises fixed supports for stabilizing the at least one input optical channel and the at least one output optical channel.

The present invention is further a method of optical switching comprising the steps of providing at least two actuator arms; fixedly holding at least one input optical channel with at least one actuator arm; fixedly holding at least one output optical channel with the remainder of the actuator arms; moving at least one of the actuator arms with respect to the others; and aligning the at least one input optical channel with the selected at least one output optical channel. Fixedly holding at least one input optical channel with at least one actuator arm comprises providing at least one opening in the actuator arm for fixedly holding at least one output end of the at least one input optical channel. The step of fixedly holding at least one output optical channel with the remainder of the actuator arms comprises providing at least one opening in the remainder of the actuator arms for fixedly holding at least one input end of the at least one output optical channel.

The method further comprises the step of receiving a switching signal with at least one voice coil motor and thereby pivoting at least one of the actuator arms. The method also further comprises achieving a positional accuracy of between approximately 0.25 and 1 micron when aligning the input and output optical channels. The method of optical switching also comprises the steps of stabilizing the at least one input optical channel with a fixed support and stabilizing the at least one output optical channel with a fixed support.

A primary object of the present invention is to provide an accurate optical switch that quickly aligns input optical fibers with selected output optical fibers using a modified conventional computer disk drive assembly with a high resolution voice coil motor.

A primary advantage of the present invention is that it uses commercially available computer disk drive assemblies to provide positional alignment accuracy of between approximately 0.25 and 1 micron. As a consequence especially due to the end-to-end placement of input and output fibers, the present invention is less expensive, more reliable, longer-lived, rapid acting, more amenable to design variation and more compatible with different system requirements than the prior art.

Another advantage of the present invention is that no collimating lenses are needed because the fibers align in close proximity to each other, end-to-end, with only a fraction of a micron misalignment. The tight connection minimizes transmission losses.

Yet another advantage of the present invention is that it benefits from the fast access time of typical computer disk drives on the order of a few milliseconds.

Still another advantage of the present invention is that it utilizes the well-established body of associated conventional and commercially available hardware and software to drive and control the disk drive optical switch.

Still yet another advantage of the present invention is that, in contrast to prior art switches that employ micro-mirrors or lenses to bounce light off of optical fibers, no micro-mirrors or lenses are used in the present invention.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The present invention switches an optical signal on or off, or directs an optical signal from an input optical channel into a selected output optical channel of a variety of output optical channels. The typical optical channel is an optical fiber, and therefore optical fibers are used to describe the operation of the present invention. However, the invention is not limited to optical fibers.

The optical signal is directed into the selected output optical fiber by aligning the output end of the input optical fiber, with the input end of the selected output optical fiber. Often optical fibers are grouped and formed in cables and the same principle applies to direct optical signals from an input group of fibers to a selected output group of fibers. It is to be understood that while sending fibers are shown and referred to as "input" fibers and other fibers receiving the signal therefrom are referred to as "output" fibers, the signal can of course travel in the opposite direction so that the output fiber or fibers become the input fiber or fibers and vice versa. The labels "input" and "output" are merely used for simplicity of explanation and the invention is not limited to light traveling in only one direction.

The present invention of an optical switch provides on-off action by displacing the ends of the input and output fibers by at least a complete fiber diameter thereby misaligning them. Signal is lost dependent upon the amount of separation of the two ends of the input and output fibers. A partial light intensity change may be accomplished by a controlled displacement distance.

To transmit the optical signal from a particular input fiber into a selected output fiber, the input and output fibers are aligned. Preferably, the ends of the input and output fibers to be aligned are either perpendicularly or cut at diagonals to "fit" each other like two pieces in a puzzle, thereby allowing the output end of the input fiber to "snap" into place against the input end of the output fiber to be more easily held there as well as to minimize signal loss.

The fiber optic switch of the present invention directs the optical signal from an input fiber to a selected output fiber by moving the end of the input fiber until it is aligned with the appropriate output fiber or vice versa, or by moving both the input and output fibers until they are aligned. The input fibers are moved by being connected to the pivotable actuator arm of a modified conventional computer controlled disk drive assembly, such as a Western Digital hard drive model WD102AARTL. The output fibers are moved by being connected to a modified, partially rotatable disk of the disk drive assembly, such as the single disk of the Western Digital hard drive, that is driven by a modified motor and software driver. Attention is now turned to the figures.

Figure 1:
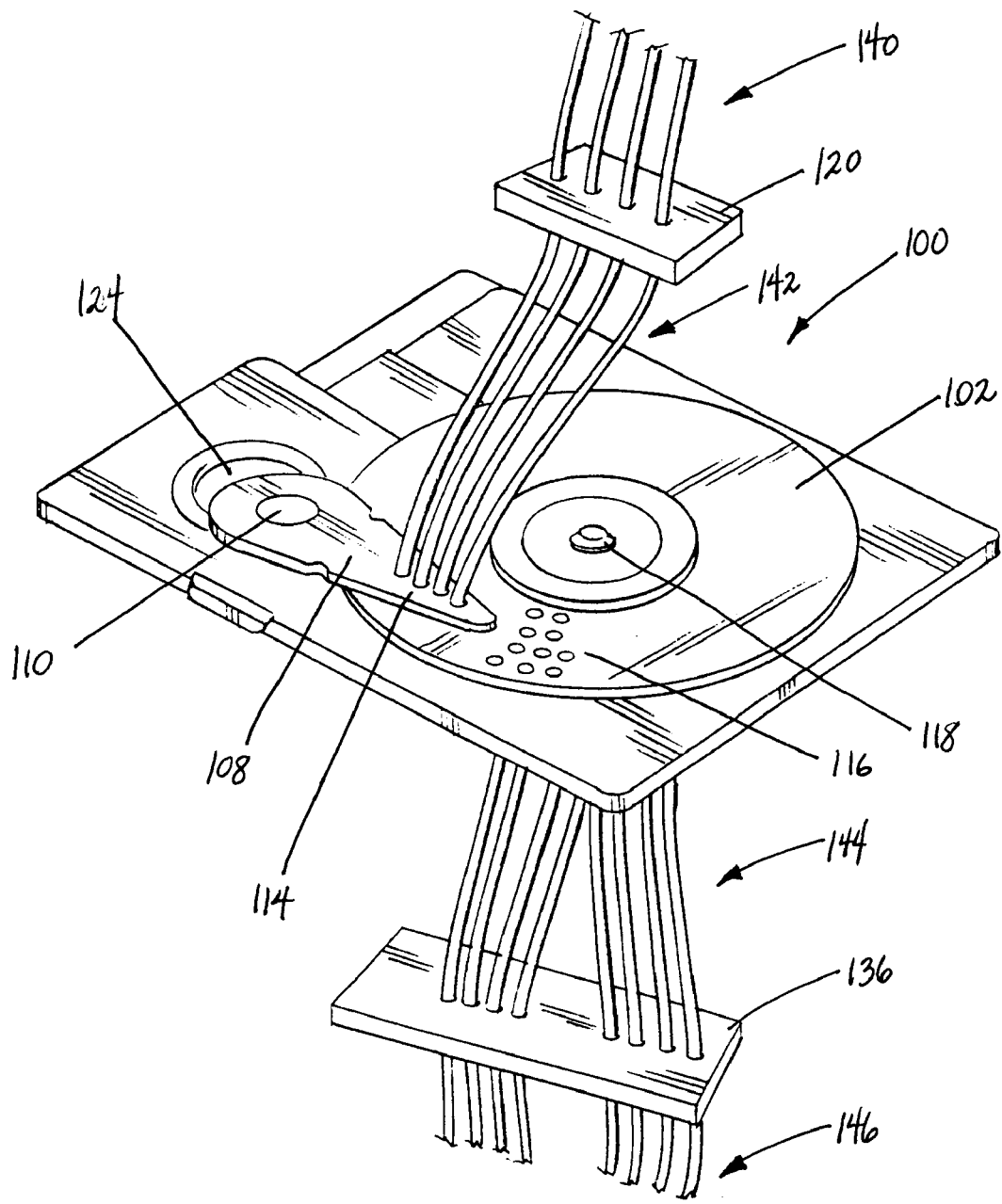
FIG. 1 is a perspective view of the disk drive optical switch of the present invention.

FIG. 1 is a perspective view of the present invention for disk drive optical switch 100. One or more input fibers shown generally at 140 are fed through openings in fixed support 120 in order to be stabilized. The same input fibers, shown generally at 142, come from fixed support 120 and are then inserted into actuator arm 108 of disk drive 100 through openings shown generally at 114. The output ends of these input fibers are fixedly held in openings 114. The fibers may be fixed in support 120, openings 114, and in fixed support 136 and disk 102 discussed next, for example, by adhesive means or via frictional fitting.

One or more output fibers 146 are fed through and stabilized by fixed support 136 and come out the other side of fixed support 136 in the area shown generally at 144. The input ends of the output fibers shown generally at 144 are fixedly held in openings shown generally at 116 in disk 102. Fixed supports 120 and 136 keep input and output fibers stable and immovable in the areas shown at 140 and 146, while still allowing input and output fibers to be movable, or capable of flexing, in the areas shown at 142 and 144.

Stabilization keeps input and output fibers from becoming unnecessarily tangled and allows the fibers only to be moved along their lengths near the ends to be aligned/misaligned. While just two fixed supports 120 and 136 are shown, more can be used in accordance with the present invention. The input and output fibers are movable over approximately a few centimeters distance using the various embodiments of the present invention.

Actuator arm 108 is pivotable via control by a voice coil motor assembly, the magnetic housing of which is shown at 124. Actuator arm 108 pivots around the voice coil motor shaft at 110 and moves over disk 102 on air bearings. By either rotating disk 102 via disk motor shaft 118, pivoting actuator arm 108, or a combination of both, the output ends of input fibers 114 are aligned with the input ends of selected output fibers at 116 as will be described further below.

While disk 102 is shown in FIG. 1 in a location beneath actuator arm 108 as is the case in typical disk drive assemblies, it is also possible to configure disk drive 100 such that disk 102 is located above actuator arm 108 instead of beneath. This is demonstrated in FIG. 2 which is a side view of the disk drive fiber optic switch. This is very similar to that of FIG. 1, except that actuator arm 108 is configured to be beneath disk 102, as an alternative embodiment. In this embodiment input fibers 140 are fed through fixed support 120, come out of fixed support 120 at 142 and then into openings 116 of disk 102 and are fixedly held there. It can be seen from this figure that there can be any number of openings 116 to receive a plurality of input fibers. This figure also shows that the input fibers remain stable and immovable at 140, but are flexible and movable by disk 102 in the area depicted at 142 when disk 102 rotates.

Figure 2:
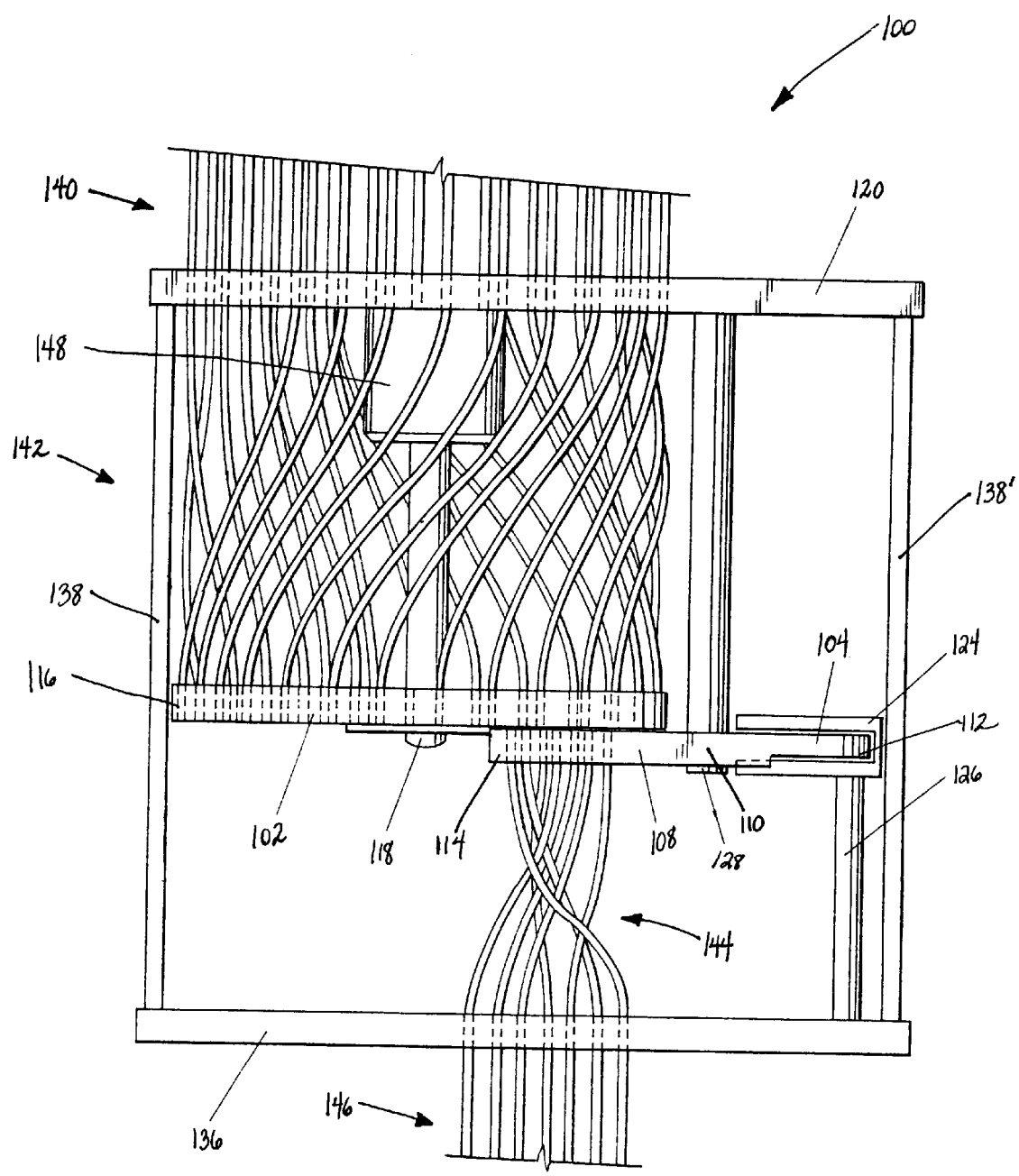
FIG. 2 is a side view of the disk drive optical switch in an alternative embodiment wherein the actuator arm is beneath the disk.

Output fibers at 146 are fed through fixed support 136, come out of fixed support 136 at 144 and then into openings 114 of actuator arm 108 and are fixedly held there. Output fibers remain stable and immovable at 146, but are movable by actuator arm 108 in the area depicted at 144 when actuator arm 108 pivots. Fixed supports 120 and 136 are any size necessary to accommodate the desired number of input and output fibers. Fixed supports 120 and 136 are optionally fixed to one another as shown in FIG. 2 by walls 138 and 138'. Walls 138 and 138' can either extend only between the two ends of fixed supports 120 and 136 or extend around the entire perimeter of disk drive optical switch 100 thereby enclosing the assembly and effectively forming a housing for switch 100.

Disk 102, or any of the embodiments of the invention, rotates an amount less than 360 degrees in either the clockwise or counterclockwise direction via shaft 118 of disk motor 148. Therefore, it is only partially rotatable. Preferably, disk 102 rotates 180 degrees, at most, so that the fibers do not become entangled. Also by being able to turn the disk 180 degrees symmetrically in either direction, the entire 360 degree range of the drive is accessible and output fibers on the entire disk surface are accessible. Disk motor 148 is a conventional disk drive flat motor. Conventionally available software provides the switching signal necessary to rotate disk 102.

Actuator arm 108 pivots at 110 via support shaft 128 which provides stability. The voice coil motor located in the area 104 of actuator arm 108 comprises an armature winding 106 (shown in FIG. 3a) around actuator arm 108 located within magnetic housing 124. The switching signal from a control means, preferably a computer, as will be described below, is fed into armature winding 106 which causes actuator arm 108 to pivot due to the interaction with magnetic housing 124 as is understood by those skilled in the art of magnets and voice coil motors. Voice coil motor located at 104 and magnetic housing 124 are supported by shaft 126 in the area depicted as 112.

In conventional, commercially-available disk drives, a software driver is provided which identifies any particular track (spirally imprinted on the disk surface) that is to be accessed by the actuator arm and its read-write head which is a small ceramic electronic read-write tip of about 2 mm×2 mm×1 mm. In seeking a track in conventional disk diagnostics, the head moves and finds a particular track of which there are typically 40,000 to 120,000 per inch of radius on a disk. The present invention uses the same driver software. However, there are no tracks to be read from or written to. Instead, optical fiber ends are located on the disk surface so that the head moves the output end of the input fiber to align with the input end of the selected output fiber embedded in the disk somewhere. Instead of tracks in the conventional sense, the disk drive optical switch has "tracks" of optical fiber ends. Therefore, the present invention makes use of existing driver software in a computer, with modifications as needed, to move the actuator arm to seek a particular "track," or location of a fiber end.

As stated above, preferably disk 102 rotates 180 degrees, in either direction, to cover 360 degrees of access due to symmetry, but need not rotate more than that or to spin like conventional disk drives. The switching signal for disk 102 is part of the optical signal from the input fibers and is sent into the electronic circuitry which controls the actuator arm and disk positioning. The optical signal, or pulses, for the disk and voice coil motors each have identification pulses as part of the signal train so that the appropriate switching signals are sent to disk 102 and actuator arm 108 respectively. The switching signals can be a tag at the beginning, the end, or at a predetermined location in the signal train. This identifies the incoming signal, the on-off action and the intended optical fibers to be moved for alignment. Disk 102 and actuator arm 108 each rotate to a new position in just a few milliseconds.

Figure 3A:
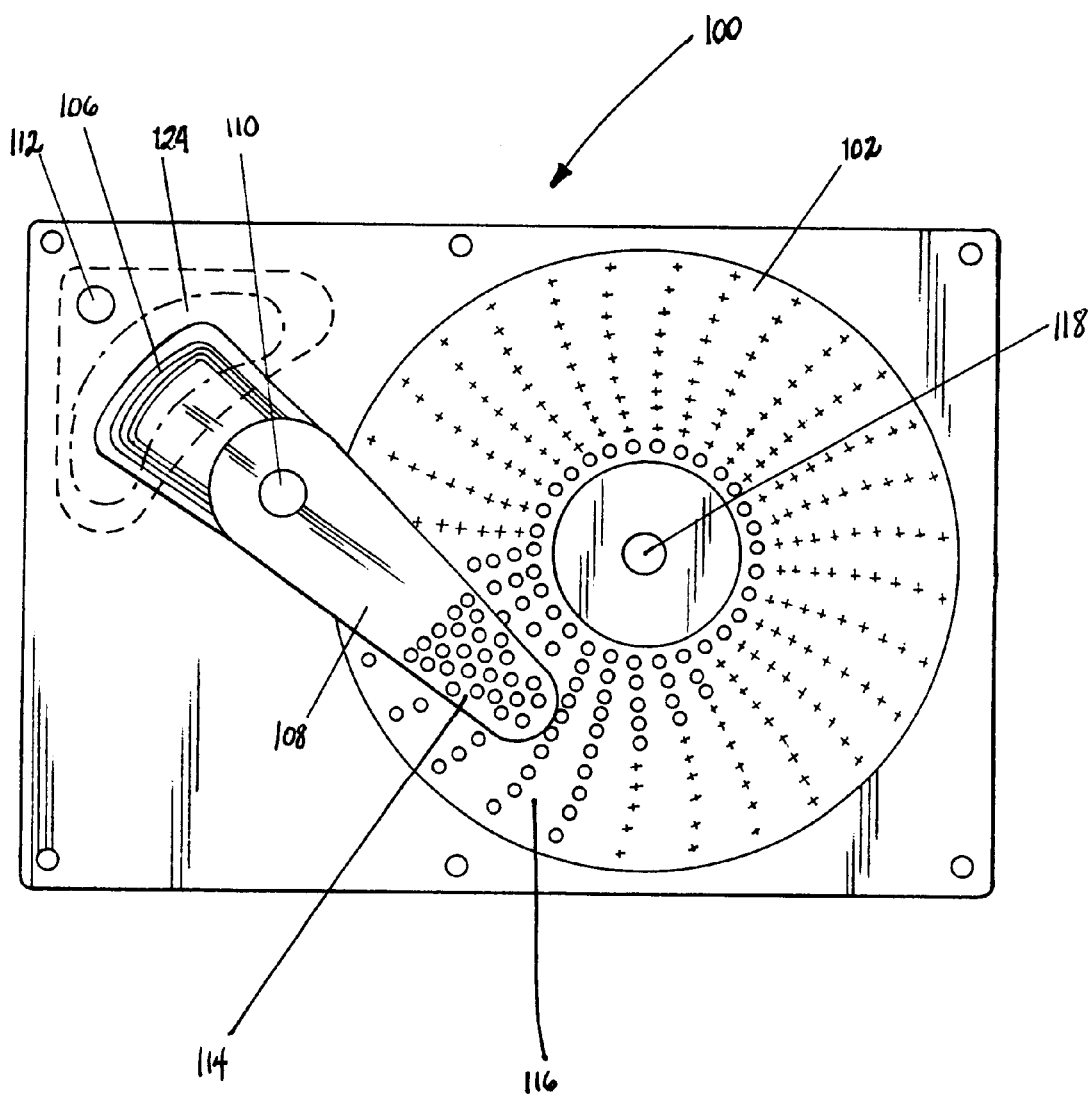
FIG. 3a is a top view of the disk drive optical switch of FIG. 1 wherein the actuator arm aligns input fibers with output fibers at the mid-radius of the disk.

Attention is now turned to FIG. 3a which shows a top view of disk drive optical switch 100 of FIG. 1. It can be seen from FIG. 3a that there are preferably a plurality of openings 114 in actuator arm 108 and a plurality of openings 116 around the entire circumference of disk 102. In this Figure, openings 114 of actuator arm 108 are aligned with selected ones of openings 116 at a mid-radius portion of disk 102, thereby aligning input fibers, not shown, with output fibers (not shown) that are fixedly held in these mid-radius openings of disk 102. Actuator arm 108 pivots inward enough that the outermost of openings 114 of actuator arm 108 are aligned with the innermost of openings 116 at the inner-radius of disk 102, and is capable of pivoting outward enough that the innermost of openings 114 are aligned with the outermost of openings 116 at the outer-radius of disk 102.

Figure 3B:
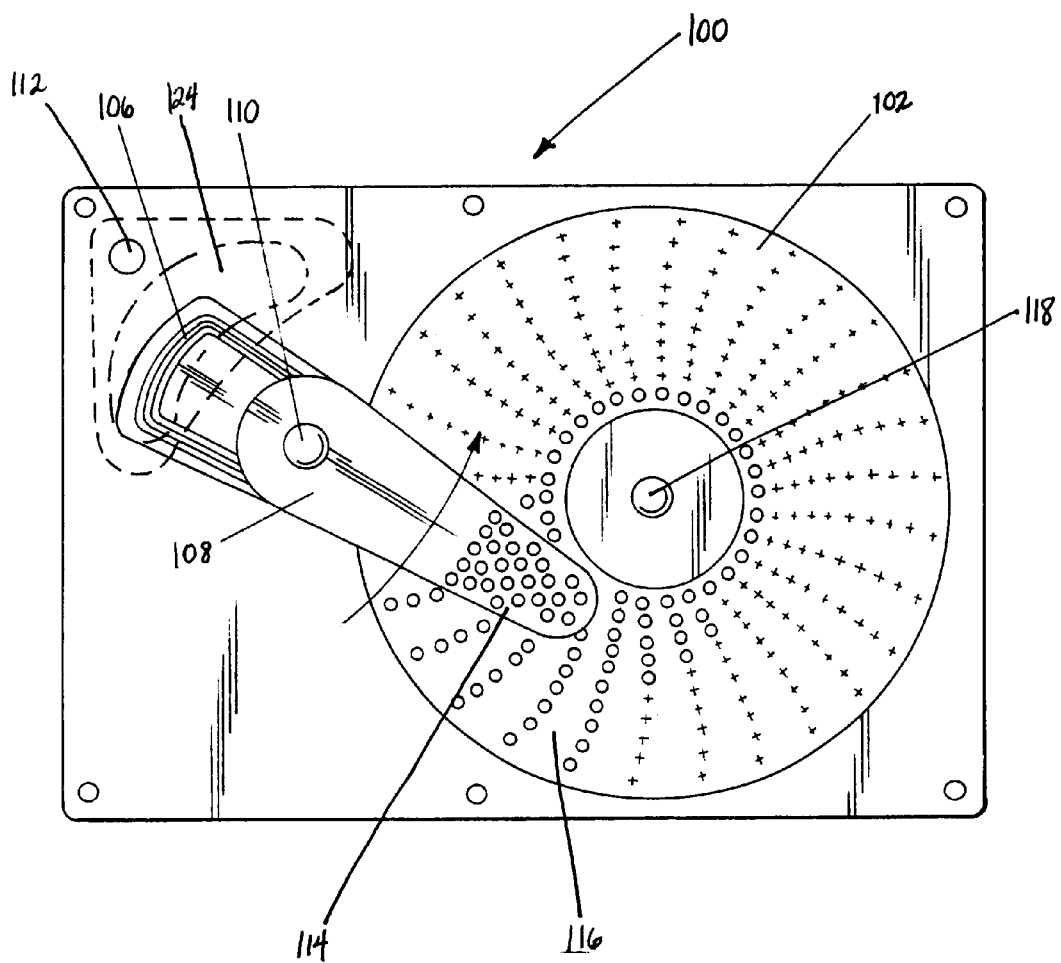
FIG. 3b is a top view of the disk drive optical switch of FIG. 3a wherein the actuator arm has been pivoted to align input fibers with output fibers at the inner-radius of the disk.

FIG. 3b shows the disk drive optical switch of FIG. 3a wherein actuator arm 108 has been pivoted inward due to a switching signal received from the control means. In this state, openings 114 in actuator arm 108 are aligned with selected ones of openings 116 at the inner-radius of disk 102, thereby aligning input fibers (not shown) with output fibers (not shown) that are fixedly held in these inner-radius openings of disk 102. A conventional computer disk drive with a high-resolution voice coil motor achieves positional resolution on the order of 0.25 to 1 micron, typically 0.5 micron, and thereby provides extremely accurate alignment of input and output fibers. The disk motor is also capable of this level of positional accuracy. This level of accuracy determines the loss factor for optical switching and transmission. For a typical 1 millimeter, or 1,000 micron, optical fiber having a 500 micron fiber core, the loss factor for photonic transmission is approximately 0.04%.

Figure 3C:
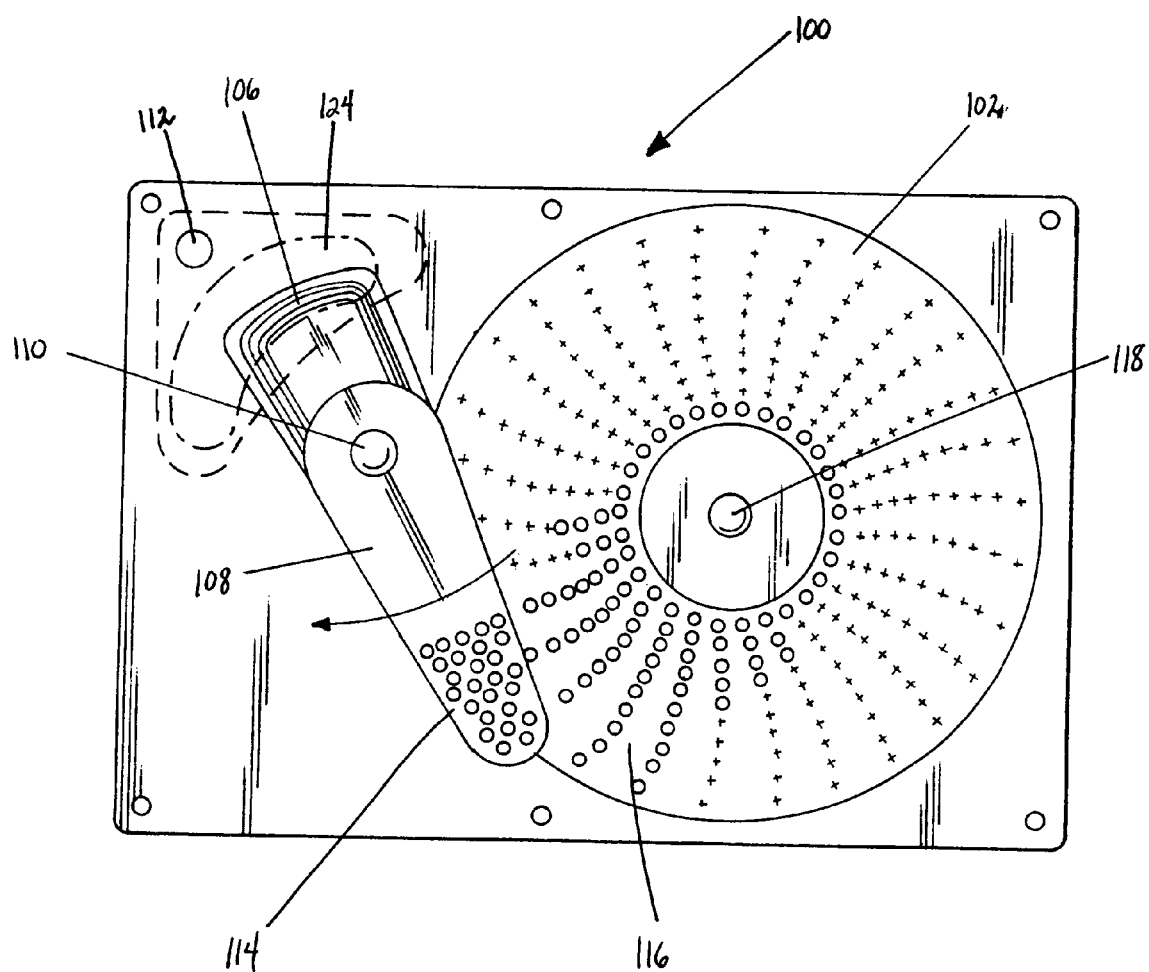
FIG. 3c is a top view of the disk drive optical switch of FIG. 3a wherein the actuator arm has been pivoted to align input fibers with output fibers at the outer-radius of the disk.

FIG. 3c shows the disk drive optical switch of FIG. 3a wherein actuator arm 108 has been pivoted outward due to a switching signal received from the control means. In this state, openings 114 in actuator arm 108 are aligned with selected ones of openings 116 at the outer-radius of disk 102, thereby aligning input fibers (not shown) with output fibers (not shown) that are fixedly held in these outer-radius openings of disk 102.

To increase the speed at which optical switch 100 aligns the input fibers with the selected output fibers, disk 102 can also be rotated upon receiving a signal from the control means as described above.

Figure 4A:
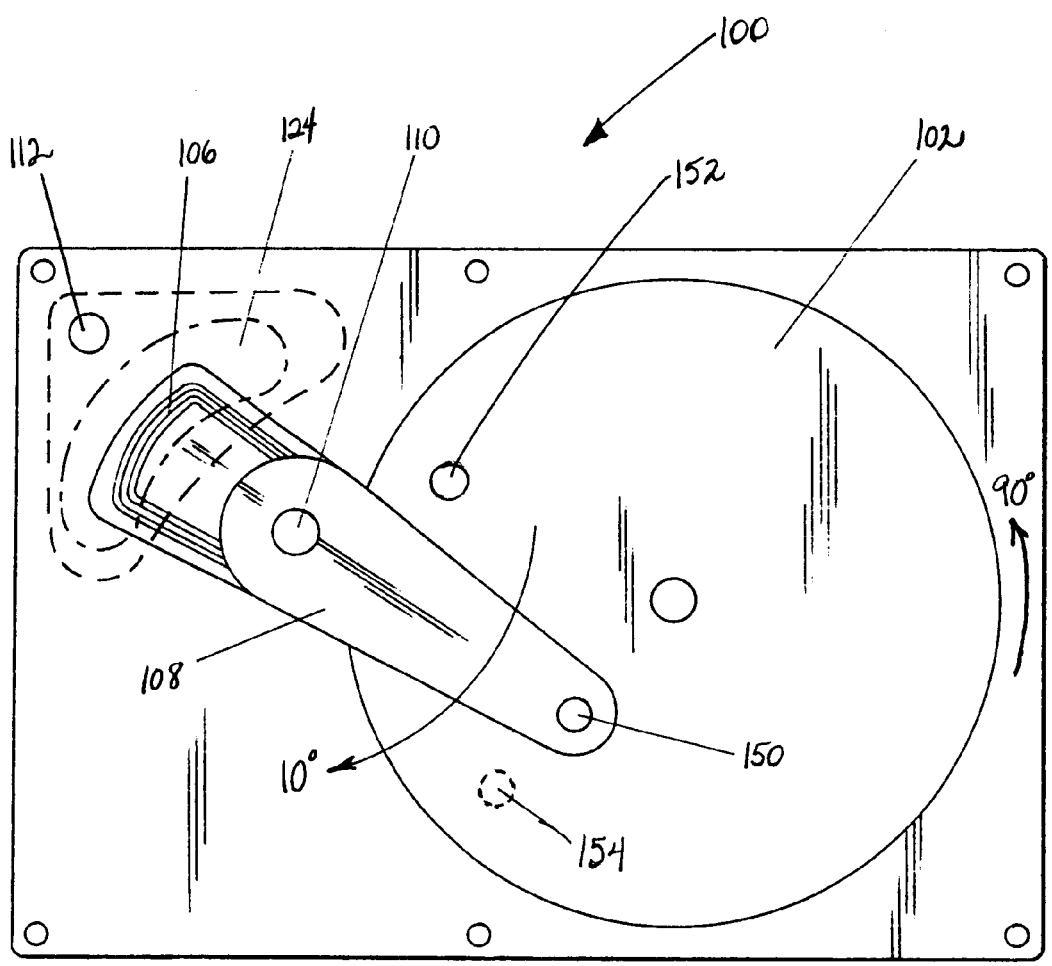
FIG. 4a is a top view of the disk drive optical switch wherein the actuator arm is to be pivoted outward and the disk is to be rotated counterclockwise in order to align a selected input fiber with a selected output fiber.
Figure 4B:
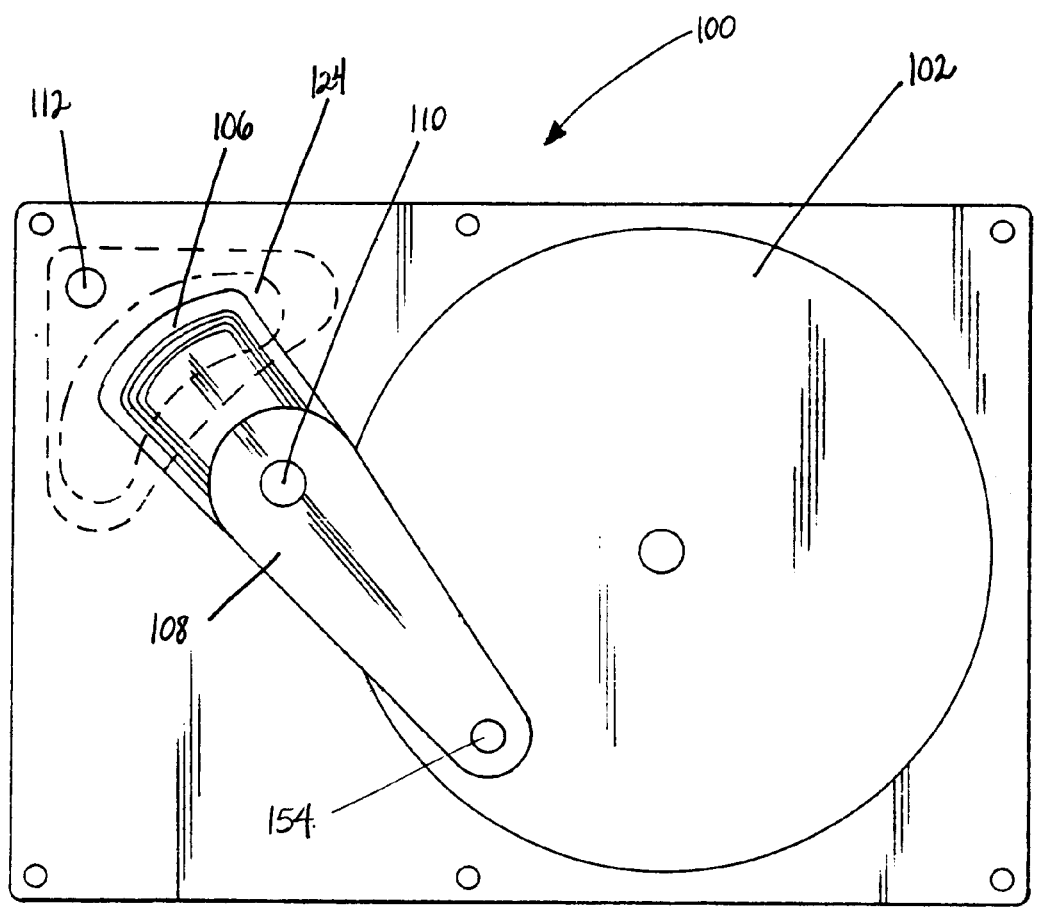
FIG. 4b is a top view of the disk drive optical switch of FIG. 4a wherein the actuator arm has been pivoted outward and the disk has been rotated counterclockwise to align the selected input fiber with the selected output fiber.

Attention is turned to FIGS. 4a and 4b to demonstrate one example of this operation. FIG. 4a is a top view of disk drive optical switch 100 having just one opening 150 shown on actuator arm 108 for an input fiber, and just one opening 152 on disk 102 for an output fiber, for simplicity of explanation. In this state, the input fiber (not shown) and the output fiber (not shown) are misaligned and the optical signal coming from the input fiber is either effectively turned off or is aligned with another output fiber that is not held in opening 152.

In order to align the input fiber respective to opening 150 with the output fiber respective to opening 152, actuator arm 108 receives a switching signal that causes it to pivot outward a specified amount (for example 10 degrees) while concurrently the disk motor for disk 102 receives a switching signal to rotate counterclockwise a specified amount (for example 90 degrees) as demonstrated by the arrows. The result is that they will meet at the point defined as 154. This result is shown by FIG. 4b. By combining the pivoting motion of actuator arm 108 with the rotation of disk 102, switch 100 is both fast and accurate. Access times of conventional voice coil motor disk drive assemblies having both a pivoting actuator arm and a rotatable disk are on the order of a few milliseconds, thereby providing a switching frequency of approximately 300 Hz.

It is apparent that any number of input fibers can be aligned with any number of selected output fibers in this manner. The number of openings 114 on actuator arm 108 and the number of openings 116 on disk 102 can be almost any amount, but typically openings 114 comprise anywhere from one to approximately 100 openings for input fibers and openings 116 comprise anywhere from one to approximately 1,000 openings for output fibers.

Figure 5:
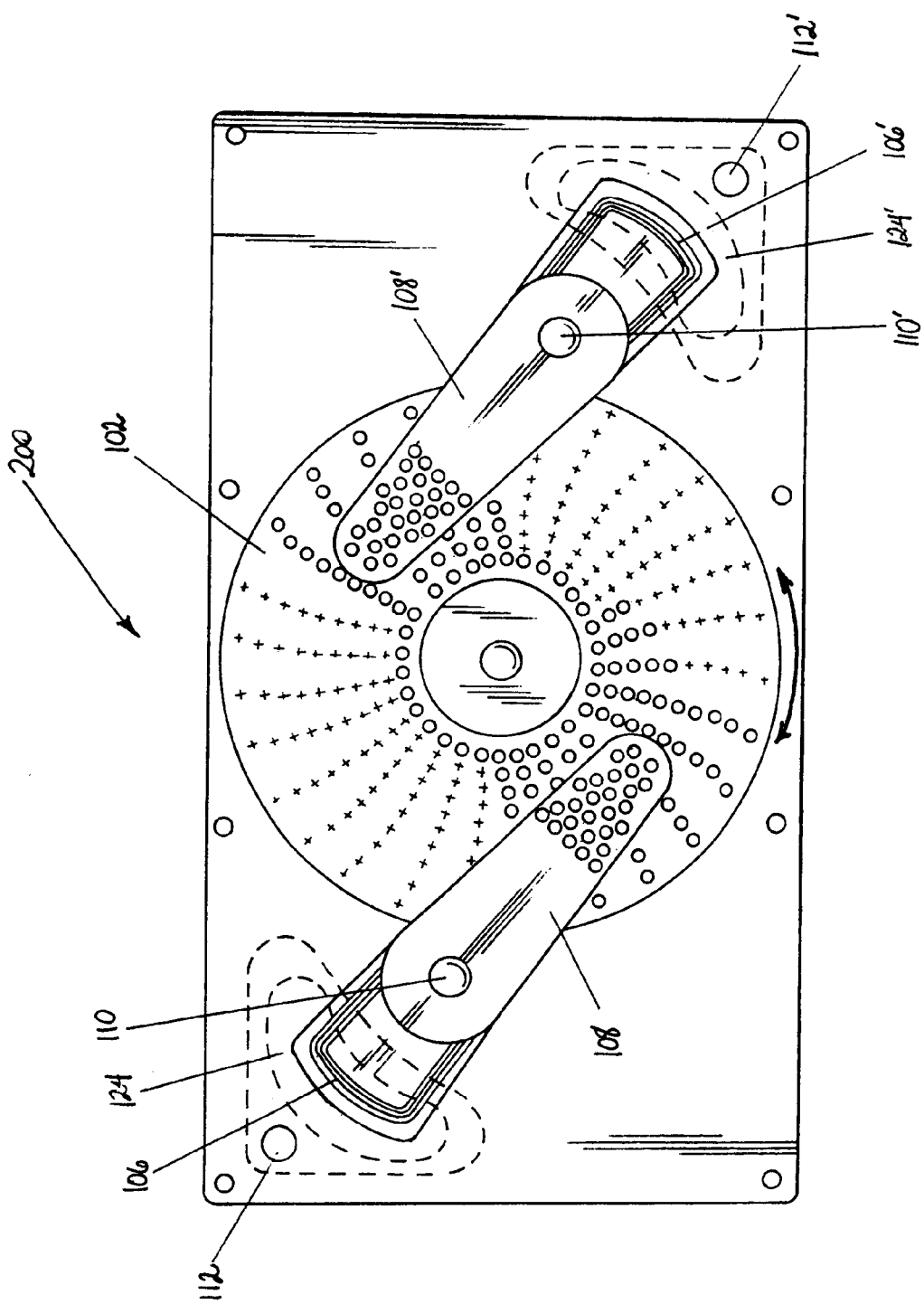
FIG. 5 is a second embodiment of the disk drive optical switch wherein two actuator arms are used to align input fibers with output fibers.

A second embodiment of the disk drive optical switch 200 is shown in FIG. 5. This embodiment is virtually identical to the first embodiment discussed above except that an additional actuator arm 108' is included. A second actuator arm switching signal is provided to actuator arm 108' to cause it to pivot as needed. This second actuator arm operates in the identical fashion as the first actuator arm 108 already described. The additional actuator arm provides for an additional set of input fibers and the advantages will be apparent to those skilled in the art.

Figure 6:
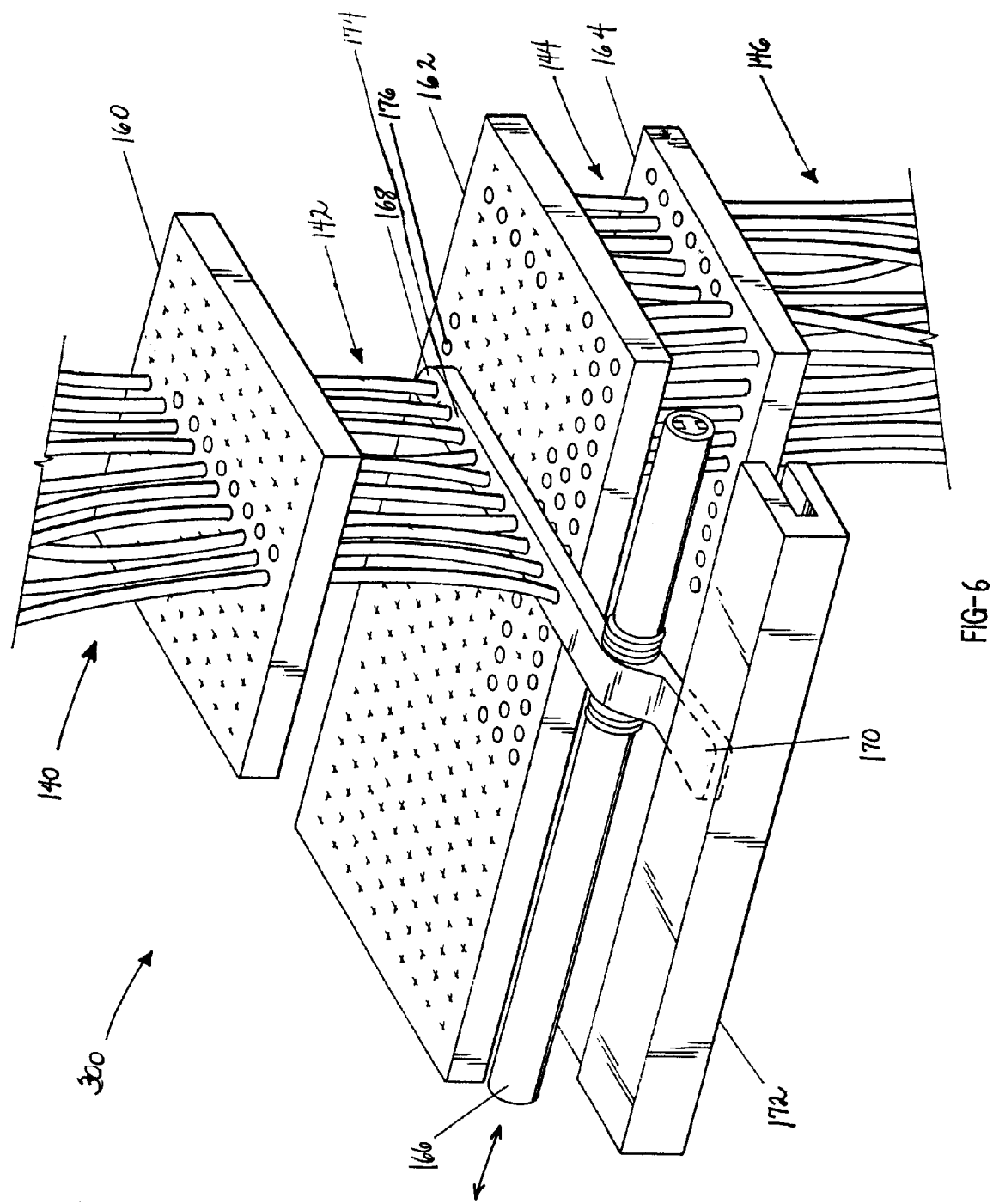
FIG. 6 is a third embodiment of the disk drive optical switch using a linear voice coil motor.

A third embodiment of the disk drive optical switch 300 is shown in FIG. 6 using a linear voice coil motor comprising of a linear voice coil in the area generally referred to as 170 within magnetic housing 172. In this embodiment, input fibers shown generally at 140 are fed through fixed support 160 so that the input fibers are stabilized and immovable in the area of 140 but movable in the area depicted at 142. Next, the input fibers at 142 are fed into openings shown generally at 174 of linear actuator arm 168 and are fixedly held there. As in the above Figures, there can be a plurality of openings 174 in actuator arm 168 to receive one or more input fibers. There can also be any number of openings in the fixed supports of this or previous discussed embodiments so that the input and output fibers can be stabilized however so desired. As described in the previous Figures, the input fibers remain stable and immovable at 140, but are movable by virtue of being connected to linear actuator arm 168 in the area depicted at 142.

Output fibers in the area depicted at 146 are fed through and stabilized by fixed support 164 and come out the other side of fixed support 164 in the area depicted at 144. The input ends of output fibers at 144 are then placed into openings 176 of disk 162 and are fixedly held there. Disk 162 moves linearly to aid in aligning the fiber ends in an equivalent manner to the rotatable disk 102 discussed above. Disk 162 is operated by a linear motor, not shown but as understood by those skilled in the art. When linear voice coil 170 receives a switching signal from the control means, it causes sliding shaft 166 and actuator arm 168 connected thereto to move in the left-right directions as indicated by the arrows, due to the interaction with magnetic housing 172. Because the input fibers are connected to actuator arm 168, the output ends of input fibers at 174 can be aligned with the input ends of selected output fibers at 176.

Figure 7:
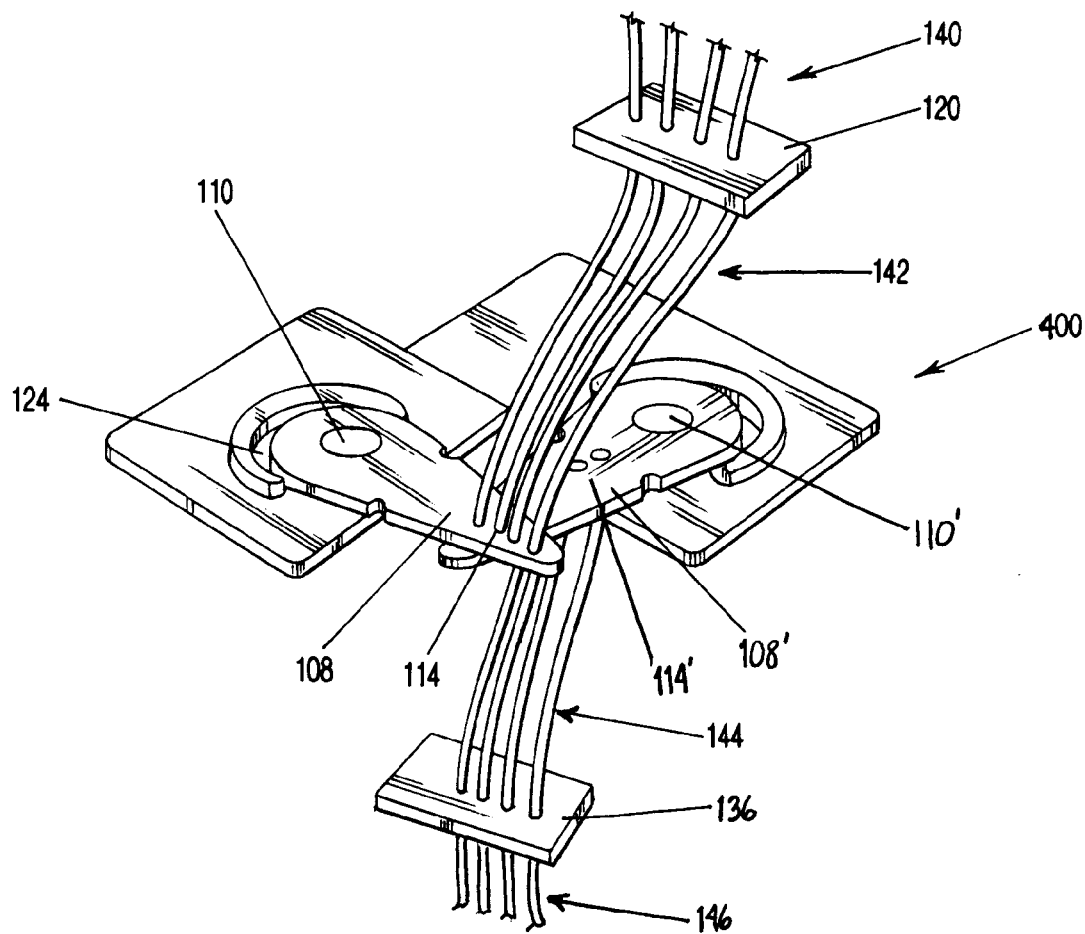
FIG. 7 is a fourth embodiment of the optical switch wherein two or more actuator arms pivot with respect to each other and are controlled by voice coil motors.

A fourth embodiment of the present invention 400 is shown in FIG. 7. In this embodiment just two actuator arms 108 and 108' are used to align input fibers with selected output fibers, without a disk. Each actuator arm 108 and 108' is controlled by a voice coil motor in the same manner as described above with respect to the first and second embodiments. The two actuator arms 108 and 108' are oriented in parallel planes to one another and pivot in relation to each other. Actuator arms 108 and 108' are shown oriented such that they are approximately ninety degrees with respect to one another, however, their orientation to one another is not to be limited to this arrangement. For example, actuator arms 108 and 108' can be oriented anywhere from approximately ten degrees to 180 degrees, and it will be apparent to those skilled in the art that the angle between the two arms can be chosen to best suit the application.

Much like that described above with respect to the other embodiments, one or more input fibers at 140 are fed through fixed support 120 for stabilization. The same input fibers, shown generally at 142, come from fixed support 120 and are then inserted into actuator arm 108 through openings shown generally at 114. The output ends of these input fibers are fixedly held in openings 114. One or more output fibers 146 are fed through and stabilized by fixed support 136 and come out the other side of fixed support 136 in the area shown generally at 144. The input ends of the output fibers shown generally at 144 are fixedly held in openings shown generally at 114' in actuator arm 108'. By pivoting one or both of actuator arms 108 and 108', input fibers are aligned with selected output fibers.

It will be understood by those skilled in the art that three or more actuator arms can be configured in a like manner. For example, in a configuration having three actuator arms, one of the arms (input) can align with either of the two other arms (outputs) to align input fibers with selected output fibers. In this configuration the two output arms pivot in a manner that moves one out of the way of the other in order to leave the other free to align with the input arm.

The present invention may be used in telecommunications for signal on-off control; signal routing from one destination to another; signal attenuation; signal combination by having two or more outgoing bundles from two or more sources to be formed into a single bundle; and signal splitting to send a signal to more than one destination. The invention may be located at either the transmitting or receiving terminals of a communication channel or any intermediate location.

Conventional disk drives are 5.25" in diameter. Recently IBM has introduced a smaller version that is 3.5" in diameter, and there is potentially a 1" diameter hard drive with 120,000 magnetic tracks per inch that are used to store information to be available in the future. The disk drive optical switch uses a five-volt power supply as do conventional disk drives. The size of the switch is also equivalent to conventional disk drives that typically are 6"×3"×0.5", while some models are more compact, on the order of 4"×3"×0.5".

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An actuator arm optical switch comprising at least two actuator arms for fixedly holding at least one input optical channel and at least one output optical channel; at least one of said actuator arms movable with respect to the others so that said at least one input optical channel is aligned with selected said at least one output optical channel; wherein longitudinal planes through said actuator arms are parallel and never coincident.

2. The optical switch of claim 1 wherein at least one of said actuator arms comprises at least one opening for fixedly holding at least one output end of the at least one input optical channel and wherein the remainder of said actuator arms comprise at least one opening for fixedly holding at least one input end of said at least one output optical channel.

3. The optical switch of claim 1 further comprising at least one voice coil motor capable of receiving a switching signal and causing said at least one actuator arm to pivot.

4. The optical switch of claim 3 wherein said voice coil motor comprises a high resolution voice coil motor providing a positional resolution of between approximately 0.25 to 1 micron.

5. The optical switch of claim 1 further comprising a fixed support for stabilizing said at least one input optical channel.

6. The optical switch of claim 1 further comprising a fixed support for stabilizing said at least one output optical channel.

7. A method of optical switching comprising the steps of:

a) providing at least two actuator arms having longitudinal planes that are parallel and never coincident;

b) fixedly holding at least one input optical channel with at least one actuator arm;

c) fixedly holding at least one output optical channel with the remainder of the actuator arms;

d) moving at least one of the actuator arms with respect to the others; and e) aligning the at least one input optical channel with the selected at least one output optical channel.

8. The method of claim 7 wherein the step of fixedly holding at least one input optical channel with at least one actuator arm comprises providing at least one opening in the actuator arm for fixedly holding at least one output end of the at least one input optical channel.

9. The method of claim 7 wherein the step of fixedly holding at least one output optical channel with the remainder of the actuator arms comprises providing at least one opening in the remainder of the actuator arms for fixedly holding at least one input end of the at least one output optical channel.

10. The method of claim 7 further comprising the step of receiving a switching signal with at least one voice coil motor and thereby pivoting at least one of the actuator arms.

11. The method of claim 10 further comprising the step of achieving a positional accuracy of between approximately 0.25 to 1 micron when aligning the input and output optical channels.

12. The method of claim 7 further comprising the step of stabilizing the at least one input optical channel with a fixed support.

13. The method of claim 7 further comprising the step of stabilizing the at least one output optical channel with a fixed support.

* * * * *